(12) United States Patent
Zhang et al.

(10) Patent No.: US 11,647,456 B2
(45) Date of Patent: May 9, 2023

(54) LAYER 1 ACTIVATION/DEACTIVATION OF SECONDARY CELL

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/248,022

(22) Filed: Jan. 5, 2021

(65) Prior Publication Data

US 2021/0219230 A1 Jul. 15, 2021

Related U.S. Application Data (60) Provisional application No. 62/959,789, filed on Jan. 10, 2020.

(51) Int. Cl.
| | |
|---|---|
| *H04W 52/02* | (2009.01) |
| *H04W 72/04* | (2023.01) |
| *H04W 80/02* | (2009.01) |
| *H04W 76/11* | (2018.01) |
| *H04W 16/28* | (2009.01) |
| *H04L 5/00* | (2006.01) |

(52) U.S. Cl.
CPC ....... *H04W 52/0206* (2013.01); *H04L 5/0055* (2013.01); *H04W 16/28* (2013.01); *H04W 72/042* (2013.01); *H04W 76/11* (2018.02); *H04W 80/02* (2013.01)

(58) Field of Classification Search
CPC ............. H04W 52/0206; H04W 16/28; H04W 72/042; H04W 76/11; H04W 80/02; H04W 76/15; H04W 76/34; H04W 76/10; H04W 16/24; H04L 5/0055; H04L 1/1864; H04L 5/001; H04L 5/0098; H04L 1/1854; H04L 5/0053; Y02D 30/70
See application file for complete search history.

(56) References Cited

U.S. PATENT DOCUMENTS

| | | | | |
|---|---|---|---|---|
| 2008/0310389 | A1* | 12/2008 | Suzuki | H04L 5/0055 370/346 |
| 2011/0134774 | A1* | 6/2011 | Pelletier | H04W 72/042 370/242 |
| 2011/0243066 | A1* | 10/2011 | Nayeb Nazar | H04L 5/0016 370/328 |

(Continued)

FOREIGN PATENT DOCUMENTS

| | | |
|---|---|---|
| EP | 2763338 A1 | 8/2014 |
| WO | 2017023370 A1 | 2/2017 |

OTHER PUBLICATIONS

International Search Report and Written Opinion—PCT/US2021/070005—ISA/EPO—dated Apr. 23, 2021.

*Primary Examiner* — Kiet Tang
(74) *Attorney, Agent, or Firm* — Harrity & Harrity, LLP (57) ABSTRACT

Various aspects of the present disclosure generally relate to wireless communication. In some aspects, a user equipment (UE) may receive a physical-layer control signal indicating to activate or deactivate a set of secondary cells (SCells); and activate or deactivate the set of SCells in accordance with the physical-layer control signal. Numerous other aspects are provided.

30 Claims, 5 Drawing Sheets

(56) References Cited

U.S. PATENT DOCUMENTS

| | | | |
|---|---|---|---|
| 2016/0285608 A1* | 9/2016 | Kwon | H04L 1/18 |
| 2017/0086172 A1 | 3/2017 | Dinan | |
| 2017/0346685 A1 | 11/2017 | Wang et al. | |
| 2018/0270756 A1* | 9/2018 | Bhattad | H04W 52/0235 |
| 2020/0059878 A1* | 2/2020 | Huang | H04L 5/0091 |
| 2021/0266939 A1* | 8/2021 | Takeda | H04W 72/1273 |

* cited by examiner

LAYER 1 ACTIVATION/DEACTIVATION OF SECONDARY CELL

CROSS-REFERENCE TO RELATED APPLICATION

This Patent application claims priority to U.S. Provisional Patent Application No. 62/959,789, filed on Jan. 10, 2020, entitled "LAYER 1 ACTIVATION/DEACTIVATION OF SECONDARY CELL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for Layer 1 activation or deactivation (activation/deactivation) of a secondary cell (SCell).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a physical-layer control signal indicating to activate or deactivate a set of secondary cells (SCells); and activating or deactivating the set of SCells in accordance with the physical-layer control signal.

In some aspects, a method of wireless communication, performed by a base station, may include selecting a set of SCells to be activated for a UE; and transmitting, to the UE, a physical-layer control signal indicating to activate or deactivate the set of SCells.

In some aspects, a UE for wireless communication may include memory and one or more processors operatively coupled to the memory. The memory and the one or more processors may be configured to receive a physical-layer control signal indicating to activate or deactivate a set of SCells; and activate or deactivate the set of SCells in accordance with the physical-layer control signal.

In some aspects, a base station for wireless communication may include memory and one or more processors operatively coupled to the memory. The memory and the one or more processors may be configured to select a set of SCells to be activated for a UE; and transmit, to the UE, a physical-layer control signal indicating to activate or deactivate the set of SCells.

In some aspects, a non-transitory computer-readable medium may store one or more instructions for wireless communication. The one or more instructions, when executed by one or more processors of a UE, may cause the one or more processors to: receive a physical-layer control signal indicating to activate or deactivate a set of SCells; and activate or deactivate the set of SCells in accordance with the physical-layer control signal.

In some aspects, a non-transitory computer-readable medium may store one or more instructions for wireless communication. The one or more instructions, when executed by one or more processors of a base station, may cause the one or more processors to: select a set of SCells to be activated for a UE; and transmit, to the UE, a physical-layer control signal indicating to activate or deactivate the set of SCells.

In some aspects, an apparatus for wireless communication may include means for receiving a physical-layer control signal indicating to activate or deactivate a set of SCells; and means for activating or deactivating the set of SCells in accordance with the physical-layer control signal.

In some aspects, an apparatus for wireless communication may include means for selecting a set of SCells to be activated for a UE; and means for transmitting, to the UE, a physical-layer control signal indicating to activate or deactivate the set of SCells.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
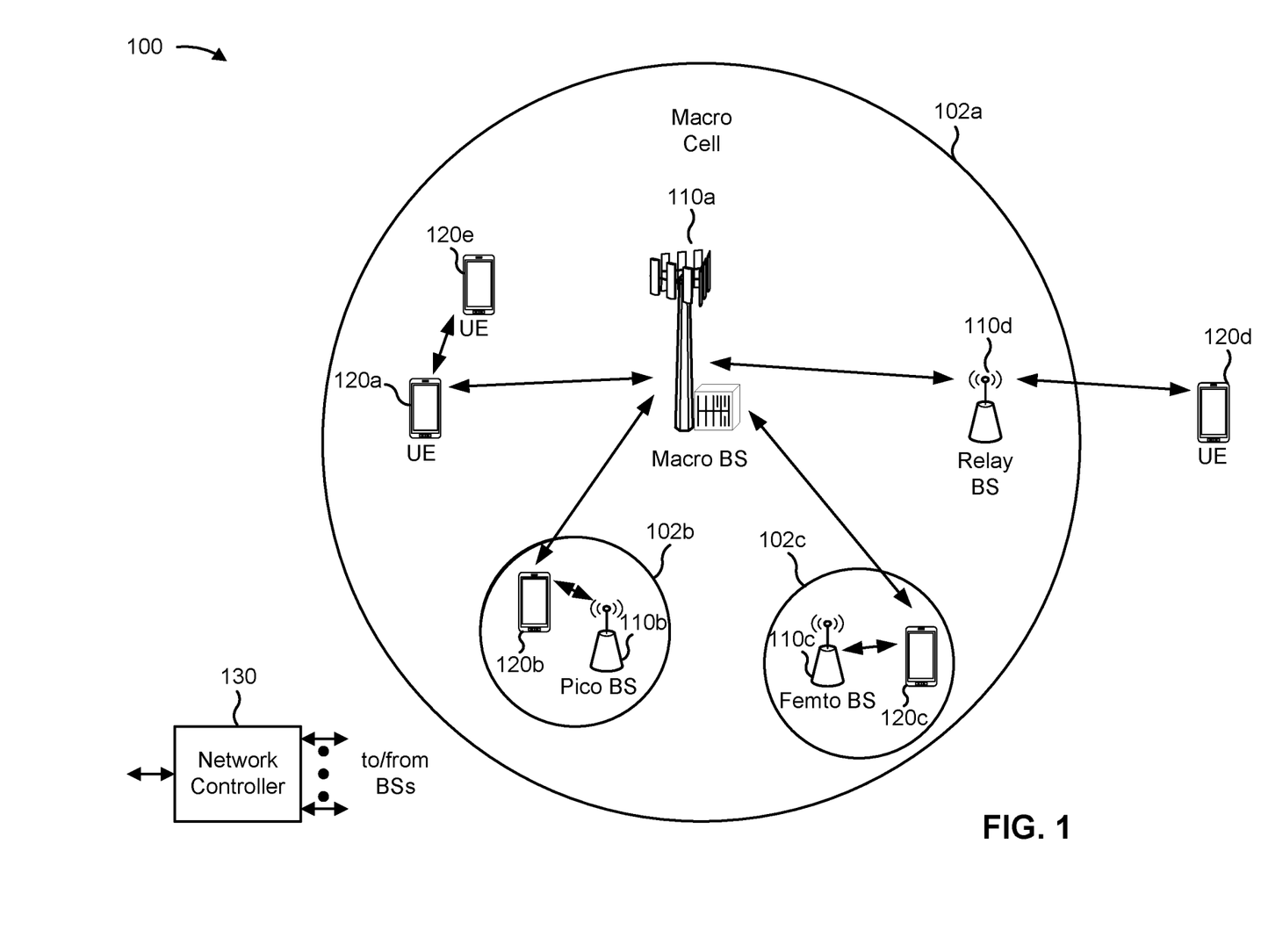
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
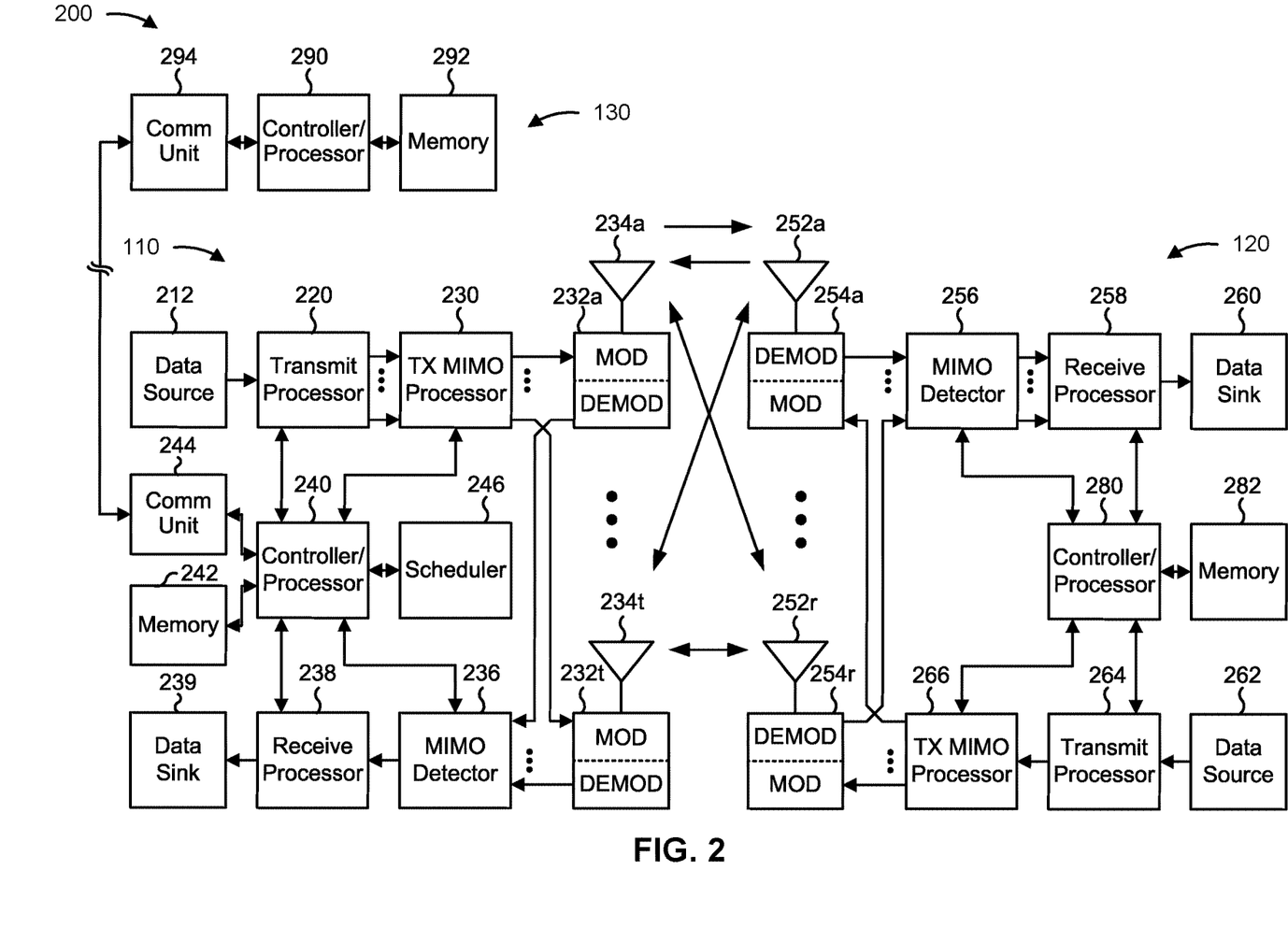
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a Layer 1 activation/deactivation of a secondary cell (SCell), as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a physical-layer control signal indicating to activate or deactivate a set of SCells; means for activating or deactivating the set of SCells in accordance with the physical-layer control signal; means for receiving information indicating whether at least one of the one or more bits or the repurposed field are enabled; means for transmitting acknowledgment (ACK) and/or negative ACK (ACK/NACK) feedback for the physical-layer control signal; means for selectively transmitting ACK/NACK feedback for the physical-layer control signal based at least in part on a hybrid automatic repeat request (HARQ) ACK codebook type of the UE; means for receiving or transmitting an indication of whether ACK/NACK feedback for the physical-layer control signal is to be transmitted; means for transmitting ACK/NACK feedback for the physical-layer control signal based at least in part on the physical-layer control signal scheduling a semi-persistent signal; means for transmitting an indication of whether ACK/NACK feedback for the physical-layer control signal is to be transmitted; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for selecting a set of SCells to be activated for a UE; means for transmitting, to the UE, a physical-layer control signal indicating to activate or deactivate the set of SCells; means for transmitting information indicating whether at least one of the one or more bits or the field are enabled; means for receiving ACK/NACK feedback for the physical-layer control signal; means for selectively receiving ACK/NACK feedback for the physical-layer control signal based at least in part on a HARQ ACK codebook type of the UE; means for receiving or transmitting an indication of whether ACK/NACK feedback for the physical-layer control signal is to be transmitted; means for receiving ACK/NACK feedback for the physical-layer control signal based at least in part on the physical-layer control signal scheduling a semi-persistent signal; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may use dual connectivity to connect to multiple cells at once. For example, the UE may select a set of candidate cells, and may select one or more primary cells (PCells), SCells, primary secondary cells (PSCells), and/or secondary primary cells or special cells (SPCells). The PCell and SCell may be referred to as serving cells. A serving cell is a cell on which a UE can transmit or receive data communication. In some aspects, "SPCell" may refer to a PCell of a master cell group or a PSCell of a secondary cell group, or to the PCell. An SPCell is a cell on which a UE can transmit or receive control signaling, RACH messages, etc.

It may be beneficial to reduce latency and higher-layer overhead of operations associated with dual connectivity. One example of such an operation is activation or deactivation of an SCell, which may be performed using MAC-layer (i.e., Layer 2) signaling. However, when activation or deactivation of an SCell is performed using MAC-layer signaling, latency and computing resource usage may be introduced, which may be detrimental to UE performance in certain situations, such as Layer 1 or Layer 2 inter-cell mobility operations.

Some techniques and apparatuses described herein provide activation or deactivation (activation/deactivation) of a set of SCells (e.g., an SCell, multiple SCells, a group of SCells, multiple groups of SCells, and/or the like) using a physical-layer (i.e., Layer 1) control signal, such as downlink control information (DCI). Some techniques and apparatuses described herein provide DCI content and formats for such activation/deactivation, ACK/NACK rules for the DCI, action time rules for the DCI, and/or the like. By activating or deactivating the set of SCells using a physical-layer control signal, latency may be reduced and computing resources of the UE may be conserved.

Figure 3:
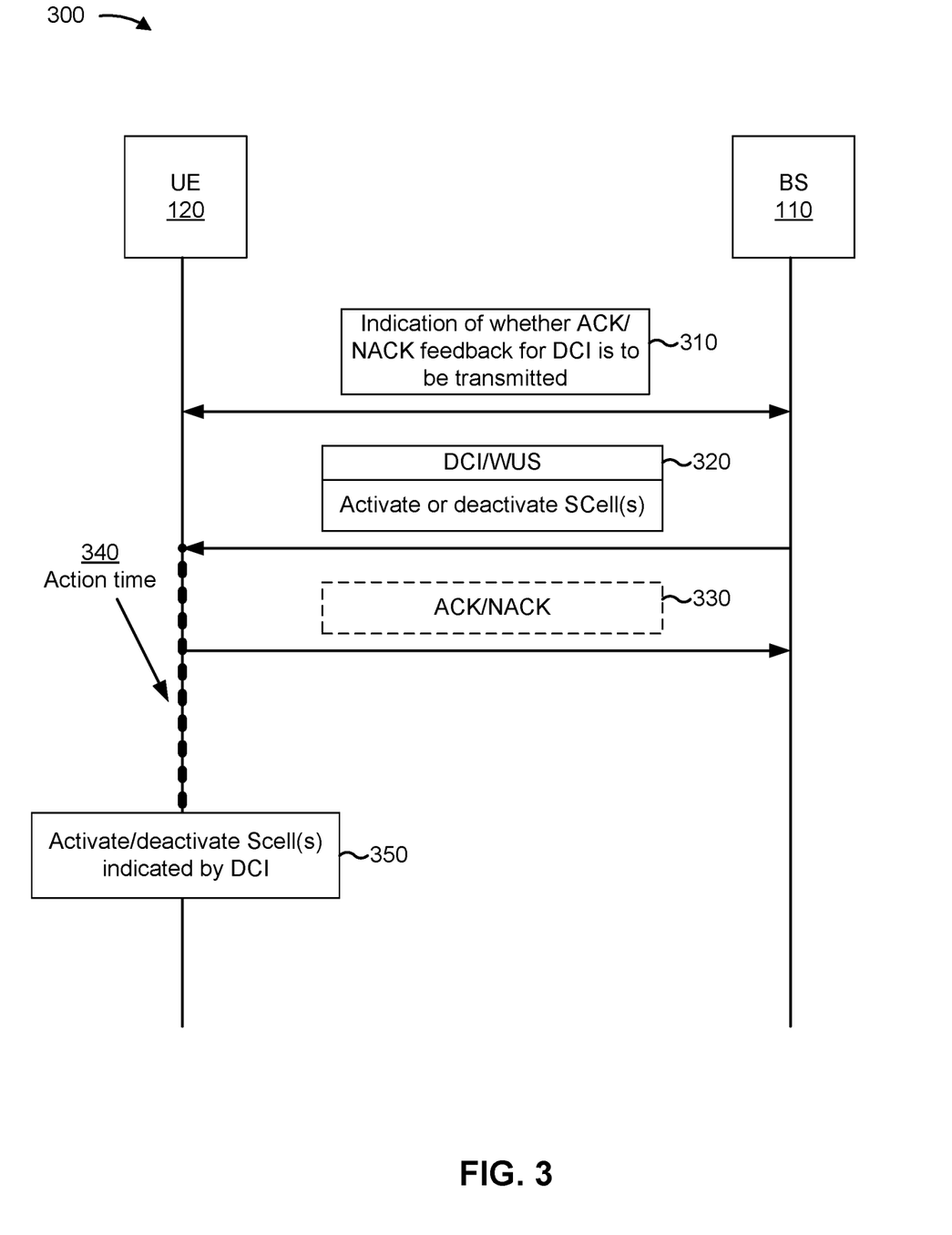
FIG. 3 is a diagram illustrating an example of Layer 1 activation/deactivation of a secondary cell (SCell), in accordance with various aspects of the present disclosure.

FIG. 3 is a diagram illustrating an example 300 of Layer 1 activation/deactivation of an SCell, in accordance with various aspects of the present disclosure. As shown, example 300 includes a UE 120 and a BS 110.

As shown in FIG. 3, and by reference number 310, in some aspects, the UE 120 or the BS 110 may provide an indication of whether the UE 120 is to transmit ACK/NACK feedback. For example, the indication may indicate whether or not the UE 120 is to transmit dedicated HARQ feedback for a physical-layer control signal, such as DCI, that activates or deactivates a set of SCells (as described below). The indication may be provided via radio resource control (RRC) signaling, a medium access control (MAC) control element (MAC-CE), DCI, and/or the like.

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an ACK in HARQ feedback. If the receiver fails to receive the communication, the receiver may transmit a NACK in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications.

In some aspects, the UE 120 may determine whether the UE 120 is to transmit HARQ feedback for the DCI. For example, the UE 120 may determine whether to transmit HARQ feedback based at least in part on a HARQ-ACK codebook type of the UE 120 (e.g., the UE 120 may determine that HARQ-ACK feedback is to be transmitted for a type 2 codebook or that no HARQ-ACK feedback is to be transmitted for a type 1 codebook, where a type 2 codebook is a dynamic HARQ codebook (e.g., based at least in part on downlink assignment indicators) and a type 1 codebook is a semi-static HARQ codebook). In some aspects, the UE 120 may determine whether the HARQ feedback is to be transmitted based at least in part on whether the DCI schedules a downlink signal or an uplink signal. In this case, the UE 120 may determine that no dedicated ACK/NACK feedback is to be transmitted based at least in part on the physical-layer control signal scheduling a downlink or uplink signal, or may determine that dedicated ACK/NACK feedback is to be transmitted based at least in part on the physical-layer control signal scheduling a downlink or uplink communication. As another example, the UE 120 may determine whether the HARQ feedback is to be transmitted based at least in part on whether the DCI activates a semi-persistent uplink or downlink signal, such as a semi-persistent scheduling grant or a configured grant. For example, the UE 120 may determine that no dedicated ACK/NACK feedback is to be transmitted based at least in part on the DCI activating a semi-persistent signal, or may determine that dedicated ACK/NACK feedback is to be transmitted based at least in part on the DCI activating a semi-persistent signal.

As shown by reference number 320, the UE 120 may receive, from the BS 110, DCI. The DCI may indicate to activate or deactivate a set of SCells. In some aspects, the DCI may activate or deactivate a single SCell, multiple SCells, a group of SCells (e.g., a cell group), or multiple groups of SCells (e.g., multiple cell groups). If the DCI activates or deactivates a group of SCells or multiple groups of SCells, one or more groups of SCells may be configured (e.g., by RRC/MAC-CE/DCI signalling), and may be identified by corresponding group identifiers. For example, the DCI may indicate one or more group identifiers corresponding to one or more cell groups of one or more SCells that are to be activated or deactivated, or may indicate one or more cell identifiers or physical cell identifiers of one or more individual SCells to be activated or deactivated.

In some aspects, the DCI to activate or deactivate the set of SCells may use a DCI format, such as DCI Format 0_1 or 1_1. The set of SCells (e.g., the SCells or cell group(s)) may be indicated by one or more bits appended to the DCI format or by one or more bits of a repurposed field of the DCI format. In some aspects, the UE 120 may receive information indicating whether one or more appended bits or a repurposed field are enabled (e.g., via RRC, MAC-CE, or DCI signalling). In some aspects, the UE 120 may receive DCI that uses a particular DCI format (e.g., a DCI format defined by 3GPP Release 15 or Release 16, DCI Format 0_1 or 1_1, and/or the like) when the UE 120 is in an active time, and may receive the DCI that uses the particular DCI format via the SPCell.

In some aspects, the DCI may also schedule a downlink or uplink transmission. In some aspects, the DCI may indicate whether the DCI also schedules a downlink or uplink transmission, for example, based at least in part on one or more values in a field (e.g., all 0s or 1s in a frequency domain resource allocation (FDRA) field for a type 0 or 1 resource allocation field).

As further shown, in some aspects, the DCI may be associated with a wakeup signal (WUS). A wakeup signal is a signal, transmitted to the UE 120 outside of an active time of the UE 120, that indicates that the UE 120 is to wake up (e.g., to receive paging and/or the like). In some aspects, the indication to activate or deactivate the set of SCells may be received via the wakeup signal. For example, when the UE 120 is outside of the active time of the UE 120, the DCI to activate or deactivate the set of SCells may be indicated by the WUS.

As shown by reference number 330, the UE 120 may transmit the ACK/NACK feedback (also referred to herein as HARQ feedback) for the DCI to the BS 110. Here, a dashed box is shown in FIG. 3 since the UE 120 may selectively transmit the ACK/NACK feedback for the DCI. In some aspects, the UE 120 may transmit the ACK/NACK feedback via a physical uplink control channel (PUCCH) or a physical uplink shared channel (PUSCH). In some aspects, the UE 120 may transmit the ACK/NACK feedback using beam sweeping and/or repetition. For example, the DCI shown by reference number 320 may activate the beam sweeping and/or repetition, or the beam sweeping and/or repetition may be activated by another signal (e.g., a DCI message, a MAC-CE message, an RRC signal, and/or the like). In some aspects, the beam sweeping and/or repetition may use spatial division multiplexing (SDM), frequency division multiplexing (FDM), time division multiplexing (TDM), and/or the like. In some aspects, the beam sweeping and/or repetition may be slot based or sub-slot based.

As shown by reference number 340, the UE 120 may perform the activation or deactivation of the set of SCells based at least in part on an action time. The action time may identify a time window within which the UE 120 is to perform activation or deactivation of the set of SCells. For example, the action time may include an activation time or a deactivation time. In some aspects, when no ACK/NACK feedback is transmitted for the DCI, the action time may be defined relative to the end of the DCI. In some aspects, when ACK/NACK feedback is transmitted for the DCI, the action time may be defined relative to the end of the DCI. Alternatively, when ACK/NACK feedback is transmitted for the DCI, the action time may be defined relative to the end of the ACK/NACK feedback. In some aspects, the action time may be defined by a variable X in terms of symbols. In one example, the value of X may be 28 symbols if a component carrier on which the DCI is received and a scheduled beam or reference signal have a subcarrier spacing (SCS) of 120 kHz.

In some aspects, the activation or deactivation of the set of SCells may be a cross-carrier activation or deactivation, meaning that a component carrier on which the DCI is received is different than a component carrier on which the set of SCells is to be activated or deactivated. In this case, the numerology and value of the action time (e.g., X) may be decided by the scheduling component carrier on which the DCI is received, the component carrier of the target set of SCells, or both the scheduling component carrier and the component carrier of the target set of SCells. For example, the numerology of the action time may be the same as the scheduling component carrier. As a second example, the numerology of the action time may be the same as the component carrier of the target set of SCells. As a third example, the numerology of the action time may be a smallest numerology of the scheduling component carrier and the component carrier of the target set of SCells. As a fourth example, the numerology of the action time may be a largest numerology of the scheduling component carrier and the component carrier of the target set of SCells.

A numerology indicates a subcarrier spacing for a carrier and/or one or more parameters associated with the subcarrier spacing, such as a cyclic prefix length. For example, a numerology may be associated with an index, which can be signaled to the UE 120 in connection with configuring a bandwidth part, a cell, or the like. The UE may determine a subcarrier spacing, a cyclic prefix length, or the like, based at least in part on the numerology. A subcarrier spacing identifies a bandwidth of subcarriers of a carrier, and can be used to determine a symbol length of the carrier.

In some aspects, the value of the action time (e.g., X) may be fixed regardless of the respective numerologies of the scheduling component carrier and the component carrier of the target set of SCells. In some aspects, the value of the action time (e.g., X) may be based at least in part on the respective numerologies of the scheduling component carrier and/or the component carrier of the target set of SCells. For example, $X=(4\times8, 4\times4, 8\times2, 12\times1)+28=(60, 44, 44, 40)$ symbols in terms of the target set of SCells' numerology if scheduling CC has a subcarrier spacing of (15, 30, 60, 120) kHz and target SCell has SCS=120 kHz.

As shown by reference number 350, the UE 120 may activate or deactivate the set of SCells in accordance with the DCI. For example, the UE 120 may activate or deactivate the set of SCells within the action time. In this way, the UE 120 may activate or deactivate an SCell or SCell group based at least in part on a physical-layer control signal (e.g., DCI), thereby reducing latency associated with activating or deactivating the SCell or SCell group and conserving computing resources.

As indicated above, FIG. 3 is provided as an example. Other examples may differ from what is described with respect to FIG. 3.

Figure 4:
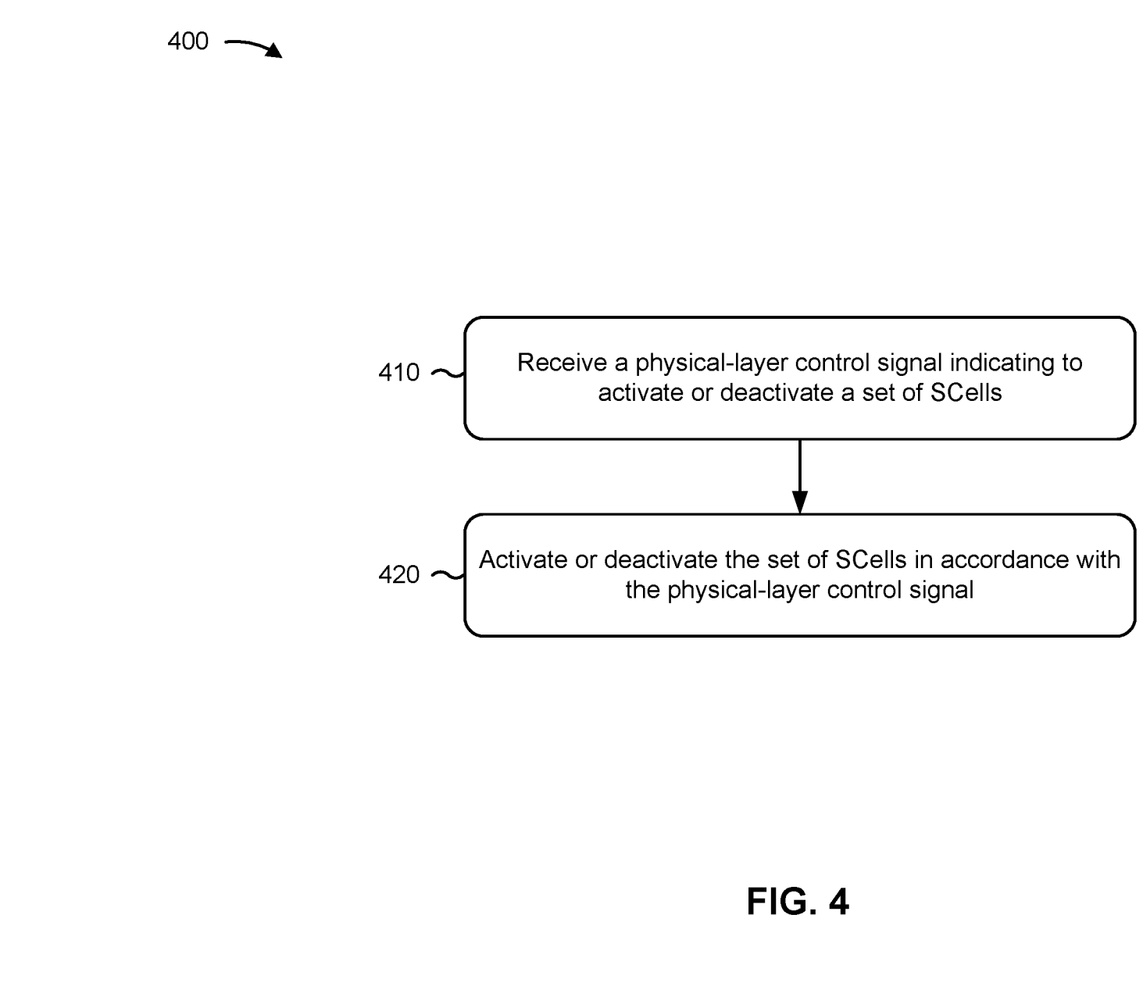
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with physical-layer SCell activation or deactivation.

As shown in FIG. 4, in some aspects, process 400 may include receiving a physical-layer control signal indicating to activate or deactivate a set of SCells (block 410). For example, the UE (e.g., using antenna 252, DEMOD 254, MIMO detector 256, receive processor 258, controller/processor 280, and/or the like) may receive a physical-layer control signal indicating to activate or deactivate a set of SCells, as described above.

As further shown in FIG. 4, in some aspects, process 400 may include activating or deactivating the set of SCells in accordance with the physical-layer control signal (block 420). For example, the UE (e.g., using controller/processor 280, transmit processor 264, TX MIMO processor 266, MOD 254, antenna 252, and/or the like) may activate or deactivate the set of SCells in accordance with the physical-layer control signal, as described above.

Process 400 may include additional aspects, such as any single aspect or any combination of aspects described below and/or in connection with one or more other processes described elsewhere herein.

In a first aspect, the activation or deactivation of the set of SCells is performed in a physical layer of the UE.

In a second aspect, alone or in combination with the first aspect, the physical-layer control signal indicates an identifier associated with the set of SCells.

In a third aspect, alone or in combination with one or more of the first and second aspects, the set of SCells comprise a cell group, and the identifier is a cell group identifier associated with the cell group.

In a fourth aspect, alone or in combination with one or more of the first through third aspects, the cell group or the cell group identifier is configured using at least one of radio resource control signaling, a MAC CE, or downlink control information.

In a fifth aspect, alone or in combination with one or more of the first through fourth aspects, the physical-layer control signal indicates respective cell identifiers or physical cell identifiers for each SCell of the set of SCells.

In a sixth aspect, alone or in combination with one or more of the first through fifth aspects, the physical-layer control signal comprises DCI of a DCI format.

In a seventh aspect, alone or in combination with one or more of the first through sixth aspects, the DCI indicates to activate or deactivate the set of SCells based at least in part on at least one of one or more bits appended to the DCI, or a repurposed field defined by the DCI format.

In an eighth aspect, alone or in combination with one or more of the first through seventh aspects, process 400 includes receiving information indicating whether at least one of the one or more bits or the repurposed field are enabled, wherein the information is received via at least one of radio resource control signaling, a MAC CE, or downlink control information.

In a ninth aspect, alone or in combination with one or more of the first through eighth aspects, the DCI, that indicates to activate or deactivate the set of SCells based at least in part on the repurposed field defined by the DCI format, is received based at least in part on the UE being in an active mode, and is received from a secondary primary cell of the UE.

In a tenth aspect, alone or in combination with one or more of the first through ninth aspects, the DCI includes scheduling information for an uplink communication or a downlink communication.

In an eleventh aspect, alone or in combination with one or more of the first through tenth aspects, the DCI includes an indication of whether the DCI includes scheduling information for an uplink communication or a downlink communication.

In a twelfth aspect, alone or in combination with one or more of the first through eleventh aspects, the UE is outside of an active time of the UE, and the physical-layer control signal comprises a wakeup signal.

In a thirteenth aspect, alone or in combination with one or more of the first through twelfth aspects, process 400 includes transmitting ACK/NACK feedback for the physical-layer control signal.

In a fourteenth aspect, alone or in combination with one or more of the first through thirteenth aspects, the ACK/NACK feedback is transmitted using repetition or beam sweeping.

In a fifteenth aspect, alone or in combination with one or more of the first through fourteenth aspects, the repetition or beam sweeping is enabled by the physical-layer control signal.

In a sixteenth aspect, alone or in combination with one or more of the first through fifteenth aspects, the repetition or beam sweeping is enabled by a signal other than the physical-layer control signal.

In a seventeenth aspect, alone or in combination with one or more of the first through sixteenth aspects, the signal other than the physical-layer control signal is received via at least one of radio resource control signaling, a MAC CE, or downlink control information.

In an eighteenth aspect, alone or in combination with one or more of the first through seventeenth aspects, the repetition or beam sweeping is performed using at least one of spatial division multiplexing, frequency division multiplexing, or time division multiplexing.

In a nineteenth aspect, alone or in combination with one or more of the first through eighteenth aspects, process 400 includes selectively is transmitting ACK/NACK feedback for the physical-layer control signal based at least in part on a HARQ ACK codebook type of the UE.

In a twentieth aspect, alone or in combination with one or more of the first through nineteenth aspects, the ACK/NACK feedback is transmitted on a physical uplink control channel or a physical uplink shared channel.

In a twenty-first aspect, alone or in combination with one or more of the first through twentieth aspects, no ACK/NACK feedback for the physical-layer control signal is transmitted.

In a twenty-second aspect, alone or in combination with one or more of the first through twenty-first aspects, process 400 includes receiving or transmitting an indication of whether ACK/NACK feedback for the physical-layer control signal is to be transmitted.

In a twenty-third aspect, alone or in combination with one or more of the first through twenty-second aspects, the indication is received or transmitted via at least one of radio resource control signaling, a MAC CE, or downlink control information.

In a twenty-fourth aspect, alone or in combination with one or more of the first through twenty-third aspects, based at least in part on the physical-layer control signal scheduling a downlink signal or an uplink signal, no ACK/NACK feedback for the physical-layer control signal is transmitted.

In a twenty-fifth aspect, alone or in combination with one or more of the first through twenty-fourth aspects, process 400 includes transmitting ACK/NACK feedback for the physical-layer control signal based at least in part on the physical-layer control signal scheduling a semi-persistent signal.

In a twenty-sixth aspect, alone or in combination with one or more of the first through twenty-fifth aspects, process 400 includes transmitting an indication of whether ACK/NACK feedback for the physical-layer control signal is to be transmitted.

In a twenty-seventh aspect, alone or in combination with one or more of the first through twenty-sixth aspects, based at least in part on no ACK/NACK feedback for the physical-layer control signal being transmitted, an action time for the activation or deactivation is measured from an end of the physical-layer control signal.

In a twenty-eighth aspect, alone or in combination with one or more of the first through twenty-seventh aspects, based at least in part on an ACK/NACK feedback for the physical-layer control signal being transmitted, an action time for the activation or deactivation is measured from an end of the ACK/NACK feedback or an end of the physical-layer control signal.

In a twenty-ninth aspect, alone or in combination with one or more of the first through twenty-eighth aspects, based at least in part on the activation or deactivation being a cross-carrier activation or deactivation, a numerology or value of an action time for the activation or deactivation is determined based at least in part on a scheduling component carrier of the UE.

In a thirtieth aspect, alone or in combination with one or more of the first through twenty-ninth aspects, based at least in part on the activation or deactivation being a cross-carrier activation or deactivation, a numerology or value of an action time for the activation or deactivation is determined based at least in part on a component carrier of the set of SCells.

In a thirty-first aspect, alone or in combination with one or more of the first through thirtieth aspects, based at least in part on the activation or deactivation being a cross-carrier activation or deactivation, a numerology of an action time for the activation or deactivation is determined based at least in part on respective numerologies of a scheduling component carrier and a component carrier of the set of SCells.

In a thirty-second aspect, alone or in combination with one or more of the first through thirty-first aspects, the numerology is a smallest numerology of the respective numerologies.

In a thirty-third aspect, alone or in combination with one or more of the first through thirty-second aspects, the numerology is a largest numerology of the respective numerologies.

In a thirty-fourth aspect, alone or in combination with one or more of the first through thirty-third aspects, based at least in part on the activation or deactivation being a cross-carrier activation or deactivation, a value of an action time for the activation or deactivation is determined based at least in part on respective numerologies of a scheduling component carrier and a component carrier of the set of SCells.

In a thirty-fifth aspect, alone or in combination with one or more of the first through thirty-fourth aspects, based at least in part on the activation or deactivation being a cross-carrier activation or deactivation, a value of an action time for the activation or deactivation is determined irrespective of respective numerologies of a scheduling component carrier and a component carrier of the set of SCells.

In a thirty-sixth aspect, alone or in combination with one or more of the first through thirty-fifth aspects, the set of SCells is associated with at least one of a cell group, or multiple cell groups.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
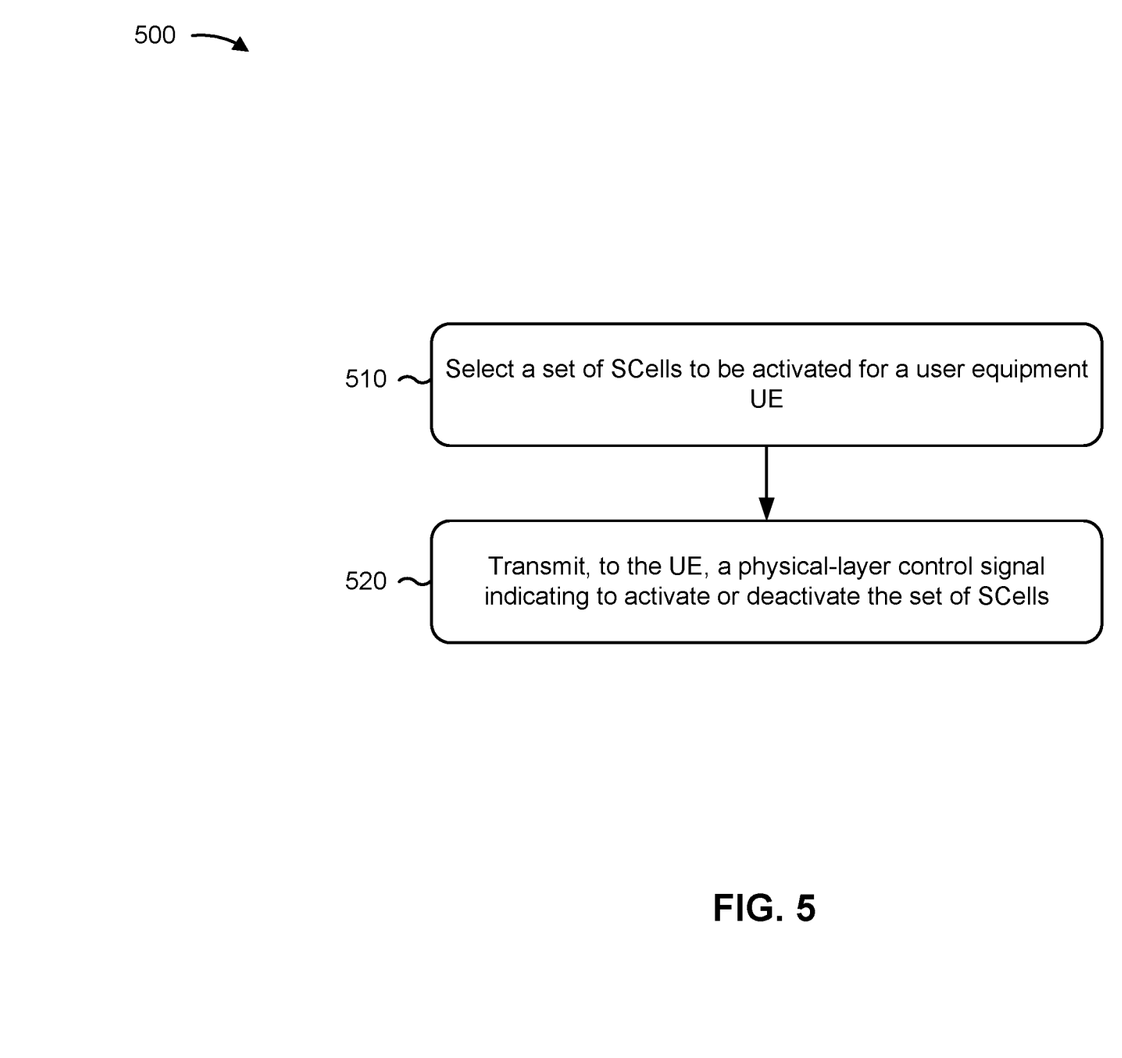
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., BS 110 and/or the like) performs operations associated with physical-layer activation or deactivation of one or more SCells.

As shown in FIG. 5, in some aspects, process 500 may include selecting a set of SCells to be activated for a UE (block 510). For example, the base station (e.g., using controller/processor 240, transmit processor 220, TX MIMO processor 230, MOD 232, antenna 234, and/or the like) may select a set of SCells to be activated for a UE, as described above.

As further shown in FIG. 5, in some aspects, process 500 may include transmitting, to the UE, a physical-layer control signal indicating to activate or deactivate the set of SCells (block 520). For example, the base station (e.g., using controller/processor 240, transmit processor 220, TX MIMO processor 230, MOD 232, antenna 234, and/or the like) may transmit, to the UE, a physical-layer control signal indicating to activate or deactivate the set of SCells, as described above.

Process 500 may include additional aspects, such as any single aspect or any combination of aspects described below and/or in connection with one or more other processes described elsewhere herein.

In a first aspect, the physical-layer control signal indicates an identifier associated with the set of SCells.

In a second aspect, alone or in combination with the first aspect, the set of SCells comprise a cell group, and the identifier is a cell group identifier associated with the cell group.

In a third aspect, alone or in combination with one or more of the first and second aspects, the cell group or the cell group identifier is configured using at least one of radio resource control signaling, a MAC CE, or downlink control information.

In a fourth aspect, alone or in combination with one or more of the first through third aspects, the physical-layer control signal indicates respective cell identifiers or physical cell identifiers for each SCell of the set of SCells.

In a fifth aspect, alone or in combination with one or more of the first through fourth aspects, the physical-layer control signal comprises DCI of a DCI format.

In a sixth aspect, alone or in combination with one or more of the first through fifth aspects, the DCI indicates to activate or deactivate the set of SCells based at least in part on at least one of one or more bits appended to the DCI, or a repurposed field defined by the DCI format.

In a seventh aspect, alone or in combination with one or more of the first through sixth aspects, process 500 includes transmitting information indicating whether at least one of the one or more bits or the field are enabled, wherein the information is being transmitted via at least one of radio resource control signaling, a MAC CE, or downlink control information.

In an eighth aspect, alone or in combination with one or more of the first through seventh aspects, the DCI, that indicates to activate or deactivate the set of SCells based at least in part on the repurposed field defined by the DCI format, is transmitted based at least in part on the UE being in an active mode, and is received from a secondary primary cell of the UE.

In a ninth aspect, alone or in combination with one or more of the first through eighth aspects, the DCI includes scheduling information for an uplink communication or a downlink communication.

In a tenth aspect, alone or in combination with one or more of the first through ninth aspects, the DCI includes an indication of whether the DCI includes scheduling information for an uplink communication or a downlink communication.

In an eleventh aspect, alone or in combination with one or more of the first through tenth aspects, the UE is outside of an active time of the UE, and the physical-layer control signal comprises a wakeup signal.

In a twelfth aspect, alone or in combination with one or more of the first through eleventh aspects, process 500 includes receiving ACK/NACK feedback for the physical-layer control signal.

In a thirteenth aspect, alone or in combination with one or more of the first through twelfth aspects, the ACK/NACK feedback is received based at least in part on repetition or beam sweeping.

In a fourteenth aspect, alone or in combination with one or more of the first through thirteenth aspects, the repetition or beam sweeping is enabled by the physical-layer control signal.

In a fifteenth aspect, alone or in combination with one or more of the first through fourteenth aspects, the repetition or beam sweeping is enabled by a signal other than the physical-layer control signal.

In a sixteenth aspect, alone or in combination with one or more of the first through fifteenth aspects, the signal other than the physical-layer control signal is transmitted via at least one of radio resource control signaling, a MAC CE, or downlink control information.

In a seventeenth aspect, alone or in combination with one or more of the first through sixteenth aspects, the repetition or beam sweeping is performed using at least one of spatial division multiplexing, frequency division multiplexing, or time division multiplexing.

In an eighteenth aspect, alone or in combination with one or more of the first through seventeenth aspects, process 500 includes selectively receiving ACK/NACK feedback for the physical-layer control signal based at least in part on a HARQ ACK codebook type of the UE.

In a nineteenth aspect, alone or in combination with one or more of the first through eighteenth aspects, the ACK/NACK feedback is transmitted on a physical uplink control channel or a physical uplink shared channel.

In a twentieth aspect, alone or in combination with one or more of the first through nineteenth aspects, process 500 includes receiving or transmitting an indication of whether ACK/NACK feedback for the physical-layer control signal is to be transmitted.

In a twenty-first aspect, alone or in combination with one or more of the first through twentieth aspects, the indication is received or transmitted via at least one of radio resource control signaling, a MAC CE, or downlink control information.

In a twenty-second aspect, alone or in combination with one or more of the first through twenty-first aspects, based at least in part on the physical-layer control signal scheduling a downlink signal or an uplink signal, no ACK/NACK feedback for the physical-layer control signal is received.

In a twenty-third aspect, alone or in combination with one or more of the first through twenty-second aspects, process 500 includes receiving ACK/NACK feedback for the physical-layer control signal based at least in part on the physical-layer control signal scheduling a semi-persistent signal.

In a twenty-fourth aspect, alone or in combination with one or more of the first through twenty-third aspects, based at least in part on no ACK/NACK feedback for the physical-layer control signal being received, an action time for the activation or deactivation is measured from an end of the physical-layer control signal.

In a twenty-fifth aspect, alone or in combination with one or more of the first through twenty-fourth aspects, based at least in part on an ACK/NACK feedback for the physical-layer control signal being received, an action time for the activation or deactivation is measured from an end of the ACK/NACK feedback or an end of the physical-layer control signal.

In a twenty-sixth aspect, alone or in combination with one or more of the first through twenty-fifth aspects, based at least in part on the activation or deactivation being a cross-carrier activation or deactivation, a numerology or value of an action time for the activation or deactivation is determined based at least in part on a scheduling component carrier of the UE.

In a twenty-seventh aspect, alone or in combination with one or more of the first through twenty-sixth aspects, based at least in part on the activation or deactivation being a cross-carrier activation or deactivation, a numerology or value of an action time for the activation or deactivation is determined based at least in part on a component carrier of the set of SCells.

In a twenty-eighth aspect, alone or in combination with one or more of the first through twenty-seventh aspects, based at least in part on the activation or deactivation being a cross-carrier activation or deactivation, a numerology of an action time for the activation or deactivation is determined based at least in part on respective numerologies of a scheduling component carrier and a component carrier of the set of SCells.

In a twenty-ninth aspect, alone or in combination with one or more of the first through twenty eighth aspects, the numerology is a smallest numerology of the respective numerologies.

In a thirtieth aspect, alone or in combination with one or more of the first through twenty-ninth aspects, the numerology is a largest numerology of the respective numerologies.

In a thirty-first aspect, alone or in combination with one or more of the first through thirtieth aspects, based at least in part on the activation or deactivation being a cross-carrier activation or deactivation, a value of an action time for the activation or deactivation is determined based at least in part on respective numerologies of a scheduling component carrier and a component carrier of the set of SCells.

In a thirty-second aspect, alone or in combination with one or more of the first through thirty-first aspects, based at least in part on the activation or deactivation being a cross-carrier activation or deactivation, a value of an action time for the activation or deactivation is determined irrespective of respective numerologies of a scheduling component carrier and a component carrier of the set of SCells.

In a thirty-third aspect, alone or in combination with one or more of the first through thirty-second aspects, the set of SCells is associated with at least one of a cell group, or multiple cell groups.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: receiving a physical-layer control signal indicating to activate or deactivate a set of secondary cells (SCells); and activating or deactivating the set of SCells in accordance with the physical-layer control signal.

Aspect 2: The method of aspect 1, wherein the activation or deactivation of the set of SCells is performed in a physical layer of the UE.

Aspect 3: The method of aspect 1, wherein the physical-layer control signal indicates an identifier associated with the set of SCells.

Aspect 4: The method of aspect 3, wherein the set of SCells comprise a cell group, and wherein the identifier is a cell group identifier associated with the cell group.

Aspect 5: The method of aspect 4, wherein the cell group or the cell group identifier is configured using at least one of: radio resource control signaling, a medium access control (MAC) control element (CE), or downlink control information.

Aspect 6: The method of aspect 3, wherein the physical-layer control signal indicates respective cell identifiers or physical cell identifiers for each SCell of the set of SCells.

Aspect 7: The method of aspect 1, wherein the physical-layer control signal comprises downlink control information (DCI) of a DCI format.

Aspect 8: The method of aspect 7, wherein the DCI indicates to activate or deactivate the set of SCells based at least in part on at least one of: one or more bits appended to the DCI, or a repurposed field defined by the DCI format.

Aspect 9: The method of aspect 8, further comprising: receiving information indicating whether at least one of the one or more bits or the repurposed field are enabled, wherein the information is received via at least one of: radio resource control signaling, a medium access control (MAC) control element (CE), or downlink control information.

Aspect 10: The method of aspect 8, wherein the DCI, that indicates to activate or deactivate the set of SCells based at least in part on the repurposed field defined by the DCI format, is received based at least in part on the UE being in an active mode, and is received from a secondary primary cell of the UE.

Aspect 11: The method of aspect 7, wherein the DCI includes scheduling information for an uplink communication or a downlink communication.

Aspect 12: The method of aspect 7, wherein the DCI includes an indication of whether the DCI includes scheduling information for an uplink communication or a downlink communication.

Aspect 13: The method of aspect 1, wherein the UE is outside of an active time of the UE, and wherein the physical-layer control signal comprises a wakeup signal.

Aspect 14: The method of aspect 1, further comprising: transmitting acknowledgment (ACK)/negative ACK (ACK/NACK) feedback for the physical-layer control signal.

Aspect 15: The method of aspect 14, wherein the ACK/NACK feedback is transmitted using repetition or beam sweeping.

Aspect 16: The method of aspect 15, wherein the repetition or beam sweeping is enabled by the physical-layer control signal.

Aspect 17: The method of aspect 15, wherein the repetition or beam sweeping is enabled by a signal other than the physical-layer control signal.

Aspect 18: The method of aspect 17, wherein the signal other than the physical-layer control signal is received via at least one of: radio resource control signaling, a medium access control (MAC) control element (CE), or downlink control information.

Aspect 19: The method of aspect 15, wherein the repetition or beam sweeping is performed using at least one of: spatial division multiplexing, frequency division multiplexing, or time division multiplexing.

Aspect 20: The method of aspect 1, further comprising: selectively transmitting acknowledgment (ACK)/negative ACK (ACK/NACK) feedback for the physical-layer control signal based at least in part on a hybrid automatic repeat request (HARQ) ACK codebook type of the UE.

Aspect 21: The method of aspect 20, wherein the ACK/NACK feedback is transmitted on a physical uplink control channel or a physical uplink shared channel.

Aspect 22: The method of aspect 1, wherein no acknowledgment (ACK)/negative ACK (ACK/NACK) feedback for the physical-layer control signal is transmitted.

Aspect 23: The method of aspect 1, further comprising: receiving or transmitting an indication of whether acknowledgment (ACK)/negative ACK (ACK/NACK) feedback for the physical-layer control signal is to be transmitted.

Aspect 24: The method of aspect 23, wherein the indication is received or transmitted via at least one of: radio resource control signaling, a medium access control (MAC) control element (CE), or downlink control information.

Aspect 25: The method of aspect 1, wherein, based at least in part on the physical-layer control signal scheduling a downlink signal or an uplink signal, no acknowledgment (ACK)/negative ACK (ACK/NACK) feedback for the physical-layer control signal is transmitted.

Aspect 26: The method of aspect 1, further comprising: transmitting acknowledgment (ACK)/negative ACK (ACK/NACK) feedback for the physical-layer control signal based at least in part on the physical-layer control signal scheduling a semi-persistent signal.

Aspect 27: The method of aspect 1, further comprising: transmitting an indication of whether acknowledgment (ACK)/negative ACK (ACK/NACK) feedback for the physical-layer control signal is to be transmitted.

Aspect 28: The method of aspect 1, wherein, based at least in part on no acknowledgment (ACK)/negative ACK (ACK/NACK) feedback for the physical-layer control signal being transmitted, an action time for the activation or deactivation is measured from an end of the physical-layer control signal.

Aspect 29: The method of aspect 1, wherein, based at least in part on an acknowledgment (ACK)/negative ACK (ACK/NACK) feedback for the physical-layer control signal being transmitted, an action time for the activation or deactivation is measured from an end of the ACK/NACK feedback or an end of the physical-layer control signal.

Aspect 30: The method of aspect 1, wherein, based at least in part on the activation or deactivation being a cross-carrier activation or deactivation, a numerology or value of an action time for the activation or deactivation is determined based at least in part on a scheduling component carrier of the UE.

Aspect 31: The method of aspect 1, wherein, based at least in part on the activation or deactivation being a cross-carrier activation or deactivation, a numerology or value of an action time for the activation or deactivation is determined based at least in part on a component carrier of the set of SCells.

Aspect 32: The method of aspect 1, wherein, based at least in part on the activation or deactivation being a cross-carrier activation or deactivation, a numerology of an action time for the activation or deactivation is determined based at least in part on respective numerologies of a scheduling component carrier and a component carrier of the set of SCells.

Aspect 33: The method of aspect 32, wherein the numerology is a smallest numerology of the respective numerologies.

Aspect 34: The method of aspect 32, wherein the numerology is a largest numerology of the respective numerologies.

Aspect 35: The method of aspect 1, wherein, based at least in part on the activation or deactivation being a cross-carrier activation or deactivation, a value of an action time for the activation or deactivation is determined based at least in part on respective numerologies of a scheduling component carrier and a component carrier of the set of SCells.

Aspect 36: The method of aspect 1, wherein, based at least in part on the activation or deactivation being a cross-carrier activation or deactivation, a value of an action time for the activation or deactivation is determined irrespective of respective numerologies of a scheduling component carrier and a component carrier of the set of SCells.

Aspect 37: The method of aspect 1, wherein the set of SCells is associated with at least one of: a cell group, or multiple cell groups.

Aspect 38: A method of wireless communication performed by a base station, comprising: selecting a set of secondary cells (SCells) to be activated for a user equipment (UE); and transmitting, to the UE, a physical-layer control signal indicating to activate or deactivate the set of SCells.

Aspect 39: The method of aspect 38, wherein the physical-layer control signal indicates an identifier associated with the set of SCells.

Aspect 40: The method of aspect 39, wherein the set of SCells comprise a cell group, and wherein the identifier is a cell group identifier associated with the cell group.

Aspect 41: The method of aspect 40, wherein the cell group or the cell group identifier is configured using at least one of: radio resource control signaling, a medium access control (MAC) control element (CE), or downlink control information.

Aspect 42: The method of aspect 39, wherein the physical-layer control signal indicates respective cell identifiers or physical cell identifiers for each SCell of the set of SCells.

Aspect 43: The method of aspect 38, wherein the physical-layer control signal comprises downlink control information (DCI) of a DCI format.

Aspect 44: The method of aspect 43, wherein the DCI indicates to activate or deactivate the set of SCells based at least in part on at least one of: one or more bits appended to the DCI, or a repurposed field defined by the DCI format.

Aspect 45: The method of aspect 44, further comprising: transmitting information indicating whether at least one of the one or more bits or the field are enabled, wherein the information is transmitted via at least one of: radio resource control signaling, a medium access control (MAC) control element (CE), or downlink control information.

Aspect 46: The method of aspect 44, wherein the DCI, that indicates to activate or deactivate the set of SCells based at least in part on the repurposed field defined by the DCI format, is transmitted based at least in part on the UE being in an active mode, and is received from a secondary primary cell of the UE.

Aspect 47: The method of aspect 43, wherein the DCI includes scheduling information for an uplink communication or a downlink communication.

Aspect 48: The method of aspect 47, wherein the DCI includes an indication of whether the DCI includes scheduling information for an uplink communication or a downlink communication.

Aspect 49: The method of aspect 38, wherein the UE is outside of an active time of the UE, and wherein the physical-layer control signal comprises a wakeup signal.

Aspect 50: The method of aspect 38, further comprising: receiving acknowledgment (ACK)/negative ACK (ACK/NACK) feedback for the physical-layer control signal.

Aspect 51: The method of aspect 50, wherein the ACK/NACK feedback is received based at least in part on repetition or beam sweeping.

Aspect 52: The method of aspect 51, wherein the repetition or beam sweeping is enabled by the physical-layer control signal.

Aspect 53: The method of aspect 51, wherein the repetition or beam sweeping is enabled by a signal other than the physical-layer control signal.

Aspect 54: The method of aspect 53, wherein the signal other than the physical-layer control signal is transmitted via at least one of: radio resource control signaling, a medium access control (MAC) control element (CE), or downlink control information.

Aspect 55: The method of aspect 51, wherein the repetition or beam sweeping is performed using at least one of: spatial division multiplexing, frequency division multiplexing, or time division multiplexing.

Aspect 56: The method of aspect 38, further comprising: selectively receiving acknowledgment (ACK)/negative ACK (ACK/NACK) feedback for the physical-layer control signal based at least in part on a hybrid automatic repeat request (HARQ) ACK codebook type of the UE.

Aspect 57: The method of aspect 56, wherein the ACK/NACK feedback is transmitted on a physical uplink control channel or a physical uplink shared channel.

Aspect 58: The method of aspect 38, further comprising: receiving or transmitting an indication of whether acknowledgment (ACK)/negative ACK (ACK/NACK) feedback for the physical-layer control signal is to be transmitted.

Aspect 59: The method of aspect 58, wherein the indication is received or transmitted via at least one of: radio resource control signaling, a medium access control (MAC) control element (CE), or downlink control information.

Aspect 60: The method of aspect 38, wherein, based at least in part on the physical-layer control signal scheduling a downlink signal or an uplink signal, no acknowledgment (ACK)/negative ACK (ACK/NACK) feedback for the physical-layer control signal is received.

Aspect 61: The method of aspect 38, further comprising: receiving acknowledgment (ACK)/negative ACK (ACK/NACK) feedback for the physical-layer control signal based at least in part on the physical-layer control signal scheduling a semi-persistent signal.

Aspect 62: The method of aspect 38, wherein, based at least in part on no acknowledgment (ACK)/negative ACK (ACK/NACK) feedback for the physical-layer control signal being received, an action time for the activation or deactivation is measured from an end of the physical-layer control signal.

Aspect 63: The method of aspect 38, wherein, based at least in part on an acknowledgment (ACK)/negative ACK (ACK/NACK) feedback for the physical-layer control signal being received, an action time for the activation or deactivation is measured from an end of the ACK/NACK feedback or an end of the physical-layer control signal.

Aspect 64: The method of aspect 38, wherein, based at least in part on the activation or deactivation being a cross-carrier activation or deactivation, a numerology or value of an action time for the activation or deactivation is determined based at least in part on a scheduling component carrier of the UE.

Aspect 65: The method of aspect 38, wherein, based at least in part on the activation or deactivation being a cross-carrier activation or deactivation, a numerology or value of an action time for the activation or deactivation is determined based at least in part on a component carrier of the set of SCells.

Aspect 66: The method of aspect 38, wherein, based at least in part on the activation or deactivation being a cross-carrier activation or deactivation, a numerology of an action time for the activation or deactivation is determined based at least in part on respective numerologies of a scheduling component carrier and a component carrier of the set of SCells.

Aspect 67: The method of aspect 66, wherein the numerology is a smallest numerology of the respective numerologies.

Aspect 68: The method of aspect 66, wherein the numerology is a largest numerology of the respective numerologies.

Aspect 69: The method of aspect 38, wherein, based at least in part on the activation or deactivation being a cross-carrier activation or deactivation, a value of an action time for the activation or deactivation is determined based at least in part on respective numerologies of a scheduling component carrier and a component carrier of the set of SCells.

Aspect 70: The method of aspect 38, wherein, based at least in part on the activation or deactivation being a cross-carrier activation or deactivation, a value of an action time for the activation or deactivation is determined irrespective of respective numerologies of a scheduling component carrier and a component carrier of the set of SCells.

Aspect 71: The method of aspect 38, wherein the set of SCells includes at least one of: a cell group of SCells, or multiple cell groups of SCells.

Aspect 72: An apparatus for wireless communication at a device, comprising a processor; memory coupled with the processor; and instructions stored in the memory and executable by the processor to cause the apparatus to perform the method of one or more aspects of aspects 1-71.

Aspect 73: A device for wireless communication, comprising a memory and one or more processors coupled to the memory, the memory and the one or more processors configured to perform the method of one or more aspects of aspects 1-71.

Aspect 74: An apparatus for wireless communication, comprising at least one means for performing the method of one or more aspects of aspects 1-71.

Aspect 75: A non-transitory computer-readable medium storing code for wireless communication, the code comprising instructions executable by a processor to perform the method of one or more aspects of aspects 1-71.

Aspect 76: A non-transitory computer-readable medium storing a set of instructions for wireless communication, the set of instructions comprising one or more instructions that, when executed by one or more processors of a device, cause the device to perform the method of one or more aspects of aspects 1-71.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical-layer control signal indicating to activate or deactivate a set of secondary cells (SCells); and
   activating or deactivating the set of SCells in accordance with the physical-layer control signal,
   wherein, based at least in part on acknowledgment (ACK)/negative ACK (ACK/NACK) feedback for the physical-layer control signal being transmitted, an action time for the activation or the deactivation is measured from an end of a transmission of the ACK/NACK feedback.

2. The method of claim 1, wherein the activation or deactivation of the set of SCells is performed in a physical layer of the UE.

3. The method of claim 1, wherein the physical-layer control signal indicates an identifier associated with the set of SCells.

4. The method of claim 3, wherein the set of SCells comprise a cell group, and wherein the identifier is a cell group identifier associated with the cell group.

5. The method of claim 3, wherein the physical-layer control signal indicates respective cell identifiers or physical cell identifiers for each SCell of the set of SCells.

6. The method of claim 1, wherein the physical-layer control signal comprises downlink control information (DCI) of a DCI format.

7. The method of claim 6, wherein the DCI indicates to activate or deactivate the set of SCells based at least in part on at least one of:
one or more bits appended to the DCI, or
a repurposed field defined by the DCI format.

8. The method of claim 7, further comprising:
receiving information indicating whether at least one of the one or more bits or the repurposed field are enabled, wherein the information is received via at least one of:
radio resource control signaling,
a medium access control (MAC) control element (CE), or
downlink control information.

9. The method of claim 7, wherein the DCI, that indicates to activate or deactivate the set of SCells based at least in part on the repurposed field defined by the DCI format, is received based at least in part on the UE being in an active mode, and is received from a secondary primary cell of the UE.

10. The method of claim 6, wherein the DCI includes at least one of scheduling information for an uplink communication or a downlink communication or an indication of whether the DCI includes scheduling information for an uplink communication or a downlink communication.

11. The method of claim 1, wherein the UE is outside of an active time of the UE, and wherein the physical-layer control signal comprises a wakeup signal.

12. The method of claim 1, further comprising:
transmitting the ACK/NACK feedback for the physical-layer control signal.

13. The method of claim 12, wherein the ACK/NACK feedback is transmitted using repetition or beam sweeping.

14. The method of claim 13, wherein the repetition or beam sweeping is enabled by one of:
the physical-layer control signal, or
a signal other than the physical-layer control signal.

15. The method of claim 1, further comprising:
selectively transmitting the ACK/NACK feedback for the physical-layer control signal based at least in part on a hybrid automatic repeat request (HARD) ACK codebook type of the UE.

16. The method of claim 1, further comprising:
receiving or transmitting an indication of whether the ACK/NACK feedback for the physical-layer control signal is to be transmitted.

17. The method of claim 1, further comprising:
transmitting the ACK/NACK feedback for the physical-layer control signal based at least in part on the physical-layer control signal scheduling a semi-persistent signal.

18. The method of claim 1, further comprising:
transmitting an indication of whether the ACK/NACK feedback for the physical-layer control signal is to be transmitted.

19. The method of claim 1, wherein, based at least in part on the activation or deactivation being a cross-carrier activation or deactivation, a numerology or value of an action time for the activation or deactivation is determined based at least in part on a scheduling component carrier of the UE.

20. The method of claim 1, wherein, based at least in part on the activation or deactivation being a cross-carrier activation or deactivation, a numerology or value of an action time for the activation or deactivation is determined based at least in part on a component carrier of the set of SCells.

21. The method of claim 1, wherein, based at least in part on the activation or deactivation being a cross-carrier activation or deactivation, a numerology of an action time or a value of the action time for the activation or deactivation is determined based at least in part on respective numerologies of a scheduling component carrier and a component carrier of the set of SCells.

22. A method of wireless communication performed by a base station, comprising:
selecting a set of secondary cells (SCells) to be activated or deactivated for a user equipment (UE); and
transmitting, to the UE, a physical-layer control signal indicating to activate or deactivate the set of SCells,
wherein an action time for the set of SCells to be activated or deactivated is measured from an end of a transmission of acknowledgment (ACK)/negative ACK (ACK/NACK) feedback for the physical-layer control signal.

23. The method of claim 22, further comprising:
receiving the ACK/NACK feedback for the physical-layer control signal.

24. The method of claim 22, wherein the physical-layer control signal indicates an identifier associated with the set of SCells.

25. The method of claim 24, wherein the set of SCells comprise a cell group, and wherein the identifier is a cell group identifier associated with the cell group.

26. A user equipment (UE) for wireless communication, comprising:
a memory; and
one or more processors coupled to the memory, the one or more processors configured to:
receive a physical-layer control signal indicating to activate or deactivate a set of secondary cells (SCells); and
activate or deactivate the set of SCells in accordance with the physical-layer control signal,
where, based at least in part on acknowledgment (ACK)/negative ACK (ACK/NACK) feedback for the physical-layer control signal being transmitted, an action time for the activation or the deactivation is measured from an end of a transmission of the ACK/NACK feedback.

27. The UE of claim 26, wherein the physical-layer control signal indicates an identifier associated with the set of SCells, wherein the set of SCells comprise a cell group, and wherein the identifier is a cell group identifier associated with the cell group.

28. The UE of claim 26, wherein the UE is outside of an active time of the UE, and wherein the physical-layer control signal comprises a wakeup signal.

29. The UE of claim 26,
wherein the ACK/NACK feedback is transmitted using repetition or beam sweeping.

30. A base station for wireless communication, comprising:
a memory; and
one or more processors coupled to the memory, the one or more processors configured to:
select a set of secondary cells (SCells) to be activated or deactivated for a user equipment (UE); and
transmit, to the UE, a physical-layer control signal indicating to activate or deactivate the set of SCells,
wherein an action time for the set of SCells to be activated or deactivated is measured from an end of a transmission of acknowledgment (ACK)/ negative ACK (ACK/NACK) feedback for the physical-layer control signal.

* * * * *